(12) United States Patent
DiBenedetto et al.

(10) Patent No.: US 8,439,637 B2
(45) Date of Patent: May 14, 2013

(54) BELLOWS PRELOAD AND CENTERING SPRING FOR A FAN DRIVE GEAR SYSTEM

(75) Inventors: Enzo DiBenedetto, Torrington, CT (US); Jason W. Mazanec, Willington, CT (US)

(73) Assignee: United Technologies Corporation, Hartford, CT (US)

( * ) Notice: Subject to any disclaimer, the term of this patent is extended or adjusted under 35 U.S.C. 154(b) by 796 days.

(21) Appl. No.: 12/622,535

(22) Filed: Nov. 20, 2009

(65) Prior Publication Data
US 2011/0123326 A1 May 26, 2011

(51) Int. Cl.
*F02C 7/06* (2006.01)
*F01D 25/16* (2006.01)

(52) U.S. Cl.
USPC ........................................................ 415/229

(58) Field of Classification Search .................. 415/103, 415/107, 142, 170.1, 229, 231; 384/517, 384/518, 563, 571
See application file for complete search history.

(56) References Cited

U.S. PATENT DOCUMENTS

| | | | |
|---|---|---|---|
| 2,850,337 A * | 9/1958 | McCallum | 384/518 |
| 3,737,109 A * | 6/1973 | Johansson | 241/37 |
| 3,738,719 A * | 6/1973 | Langner | 384/517 |
| 4,084,861 A | 4/1978 | Greenberg et al. | |
| 4,523,864 A * | 6/1985 | Walter et al. | 384/613 |
| 4,727,762 A * | 3/1988 | Hayashi | 74/89.37 |
| 4,867,655 A | 9/1989 | Barbic et al. | |
| 4,911,610 A * | 3/1990 | Olschewski et al. | 415/170.1 |
| 4,952,076 A | 8/1990 | Wiley, III et al. | |
| 4,981,415 A | 1/1991 | Marmol et al. | |
| 5,051,005 A * | 9/1991 | Duncan | 384/517 |
| 5,622,438 A | 4/1997 | Walsh et al. | |
| 5,791,789 A | 8/1998 | Van Duyn et al. | |
| 6,082,959 A * | 7/2000 | Van Duyn | 415/9 |
| 6,439,772 B1 | 8/2002 | Ommundson et al. | |
| 6,623,166 B2 * | 9/2003 | Andren et al. | 384/517 |
| 6,942,451 B1 * | 9/2005 | Alexander et al. | 415/119 |
| 2006/0239845 A1 * | 10/2006 | Yamamoto et al. | 417/423.12 |
| 2009/0123271 A1 | 5/2009 | Coffin et al. | |

FOREIGN PATENT DOCUMENTS

EP 2060809 5/2009

* cited by examiner

*Primary Examiner* — Edward Look
*Assistant Examiner* — Jesse Prager
(74) *Attorney, Agent, or Firm* — Kinney & Lange, P.A.

(57) ABSTRACT

An assembly includes a first tapered roller bearing and a second tapered roller bearing and a bellows spring. The bellows spring is disposed adjacent the first tapered roller bearing and the second tapered roller bearing.

16 Claims, 3 Drawing Sheets

BELLOWS PRELOAD AND CENTERING SPRING FOR A FAN DRIVE GEAR SYSTEM

BACKGROUND

The present invention relates to gas turbine engines, and more particularly, to engines with a fan drive gear system having tapered roller bearings.

The rotating shafts and other rotating turbomachinery of gas turbine engines are supported from a non-rotating structure by arrays of anti-friction bearings including tapered roller bearings. In many engines, anti-friction bearings are enclosed in bearing compartments with small envelopes that circumscribe the engine shaft.

In engines with a fan drive gear system, a fan shaft connects a forward-most spool of the engine to a fan. However, due to envelope constraints, the fan shaft is relatively short making it susceptible to instability. In general, because of the relative shortness of the fan shaft, an assembly of tapered roller bearings is used to support the fan shaft in two locations along its length to provide for greater shaft stability (i.e. to increase the wheelbase length of the fan shaft). A spring load must be maintained between the tapered roller bearings to keep the rollers in contact with the raceways. Unfortunately, the spring load applied to these tapered roller bearings in the prior art has either been too stiff in the axial direction (along the engine centerline) to easily accommodate variation due to component tolerances or are not accommodating of bearing flexure in the radial direction so as to allow for proper operation and motion of a squeeze film damper without causing excessive bearing wear.

SUMMARY

An assembly includes a first tapered roller bearing and a second tapered roller bearing and a bellows spring. The bellows spring is disposed adjacent the first tapered roller bearing and the second tapered roller bearing.

A method for applying a preload to a first tapered roller bearing and a second tapered roller bearing. The method includes a bellows spring that is disposed between the first tapered roller bearing and the second tapered roller bearing to apply the preload to both the first tapered roller bearing and the second tapered roller bearing.

DETAILED DESCRIPTION

The present application describes a method and an assembly for applying preload to a first tapered roller bearing and a second tapered roller bearing in a bearing compartment of a gas turbine engine. Use of a bellows spring allows a single element to be used in the confined space of a bearing compartment, thereby saving space and reducing manufacturing costs. The bellows spring is adapted to apply preload to first and second tapered roller bearings in an axial direction (along the engine centerline), and acts as a centering spring (i.e. has a radial stiffness with respect to the engine centerline) for a squeeze film damper system. The bellows spring is accommodating of flexing in the radial direction by the first tapered roller bearing and the second tapered roller bearing such that the bellows spring does not wear on the surfaces of bearings.

Figure 1:
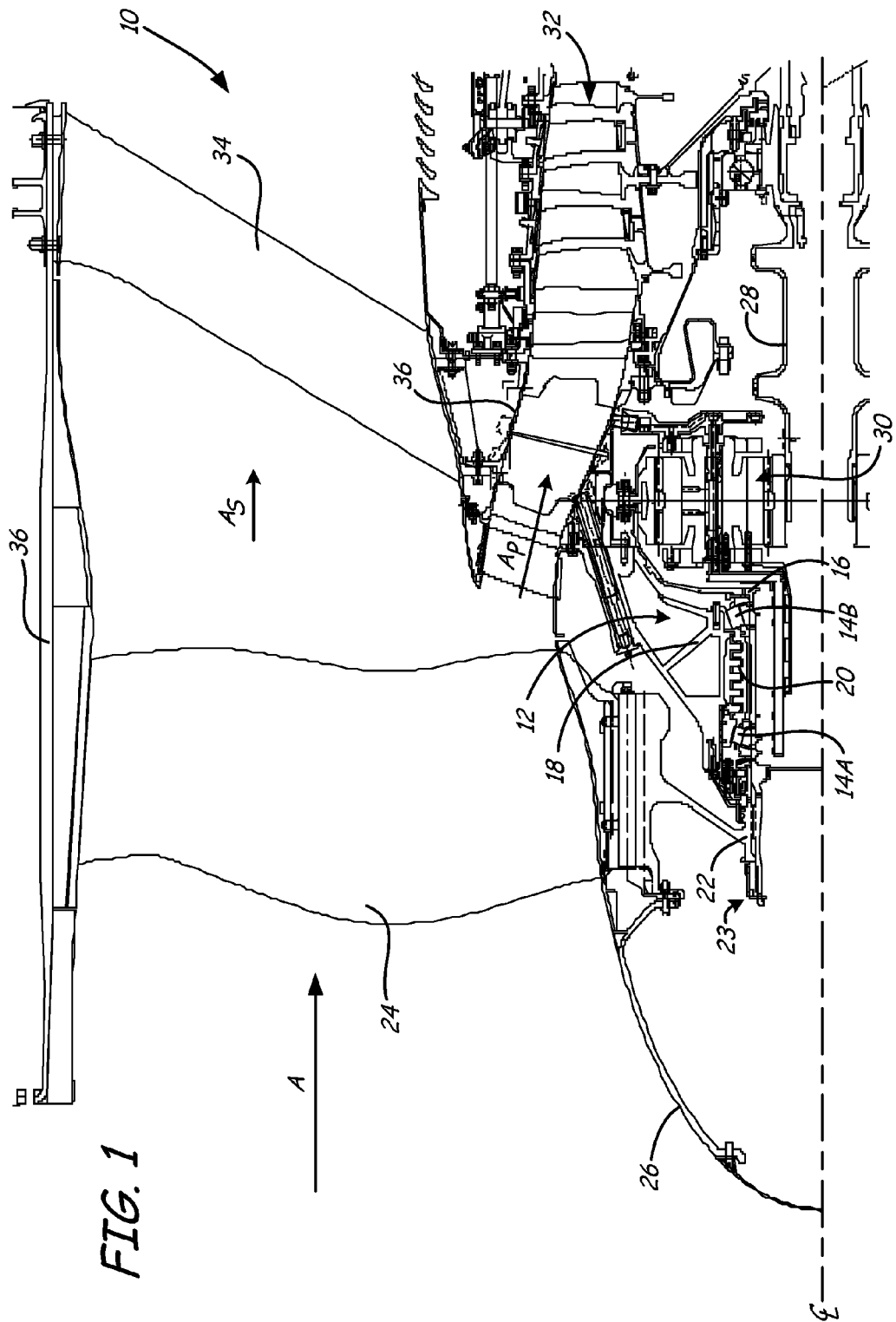
FIG. 1 is a schematic cross-section of a forward portion of a gas turbine engine.

FIG. 1 shows a forward section of gas turbine engine 10 above engine centerline $C_L$ of gas turbine engine 10. Gas turbine engine 10 includes bearing compartment 12, first and second tapered roller bearings 14A and 14B, fan shaft 16, bearing support 18, bellows spring 20, fan hub 22, nut 23, fan blades 24, fan nose 26, engine shaft 28, fan drive gear system 30, compressor section 32, guide vanes 34, and engine case 36.

Bearing compartment 12 is disposed adjacent fan shaft 16 and contains first and second tapered roller bearings 14A and 14B therein. Fan shaft 16 rotates about an axis that aligns with engine centerline axis $C_L$ and is supported on tapered roller bearings 14A and 14B. Bearing compartment 12 is bounded by fan shaft 16 and bearing support 18 which connects to the tapered roller bearings 14A and 14B. Bearing support 18 extends to connect to a non-rotational frame such as an engine case of gas turbine engine 10. Bellows spring 20 is disposed in bearing compartment 12 adjacent first tapered roller bearing 14A and second tapered roller bearing 14B. Bellows spring 20 applies a preload to both first tapered roller bearing 14A and second tapered roller bearing 14B. Nut 23 is positioned adjacent the fan hub 22 and applies a clamping force to the radially inner race portion of first tapered roller bearing 14A and the inner race portion of second tapered roller bearing 14B Fan shaft 16 connects to and turns fan blades 24 through fan hub 22. Fan hub 22 also connects to fan nose 26. Fan shaft 16 connects to engine shaft 28 via fan drive gear system 30. Compressor section 32 is disposed radially outward of engine centerline $C_L$ and is connected to engine shaft 28. Guide vanes 34 are disposed radially outward of compressor section 32 and are rotatable relative to engine case 36.

The operational principles of gas turbine engine 10 are well known in the art, and therefore, will not be discussed in great detail. As illustrated in FIG. 1, gas turbine engine 10 comprises a high bypass ratio geared turbofan engine. In other embodiments, gas turbine engine 10 can comprise another type of gas turbine engine used for aircraft propulsion or power generation. Similarly, bearing compartment 12 can comprise any bearing compartment in engine 10.

Fan shaft 16 and compressor section 32 are connected to a turbine section (not shown) through engine shaft 28. Inlet air A enters engine 10 whereby it is divided into streams of a primary air $A_P$ and a secondary air $A_S$ after passing through the fan blades 18. The fan blades 24 are rotated by turbine section (not shown) of engine 10 through engine shaft 28 to accelerate the secondary air $A_S$ (also known as bypass air) through exit guide vanes 34, thereby producing a significant portion of the thrust output of engine 10. The primary air $A_P$ (also known as gas path air) is directed into compressor section 32. Compressor section 32 works together to incrementally increase the pressure and temperature of primary air $A_P$.

Figure 2:
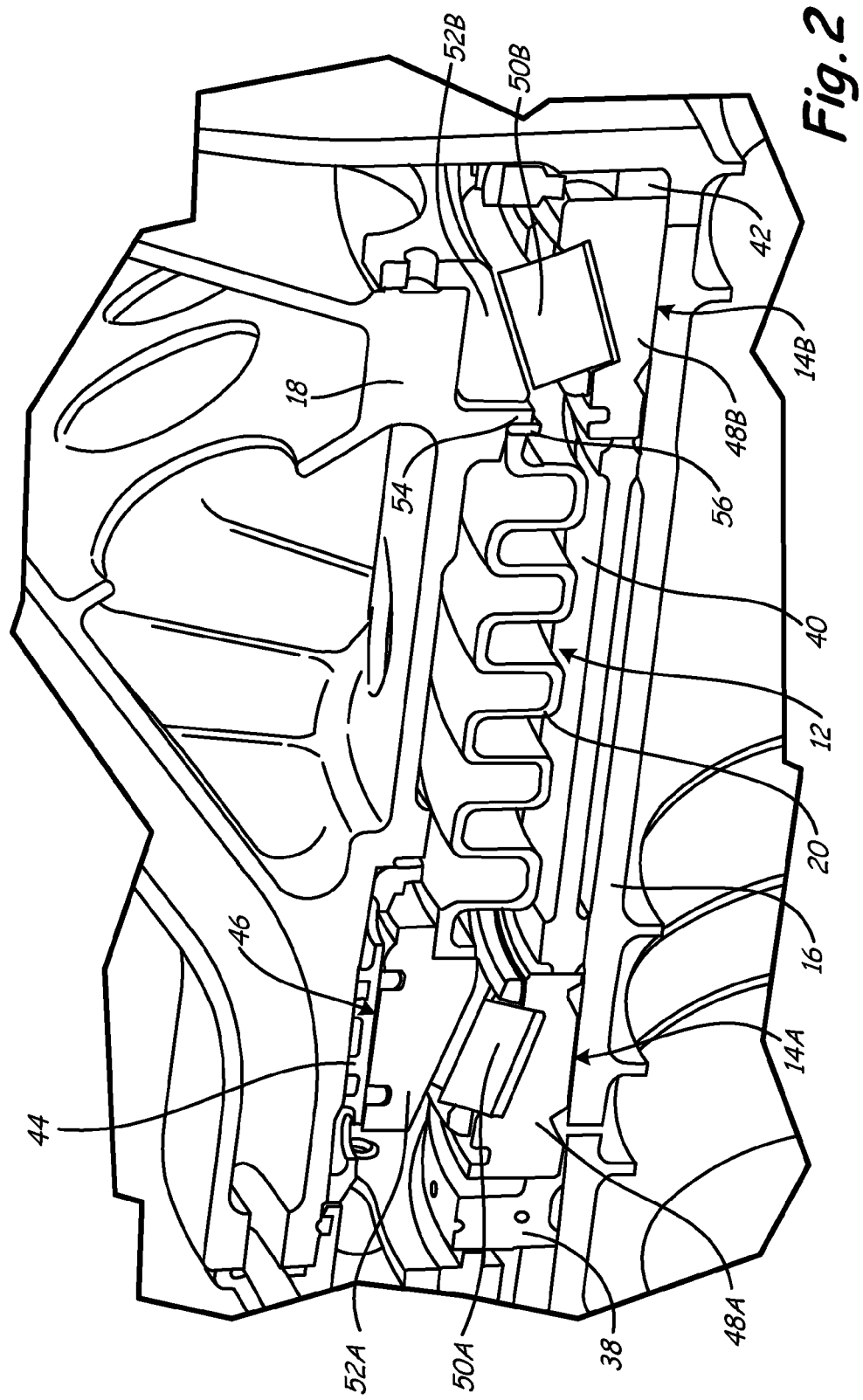
FIG. 2 is a perspective cross-sectional view of a bearing compartment including a first tapered roller bearing, a second tapered roller bearing and a bellows spring.

FIG. 2 shows a perspective cross-sectional view of bearing compartment 12 including first tapered roller bearing 14A, second tapered roller bearing 14B, and bellows spring 20. Additionally, bearing compartment 12 includes seal plate 38, bearing spacer 40, gear 42, secondary sleeve 44, and squeeze film damper system 46. First and second tapered roller bearings 14A and 14B include inner races 48A and 48B, roller elements 50A and 50B, and outer races 52A and 52B, respectively. Also shown are shoulder 54 of bearing support 18 and shim 56.

Within bearing compartment 12, seal plate 38 abuts a forward portion of (as defined by the direction of primary air $A_P$ flow within the gas turbine engine 10) first tapered roller bearing 14A. Seal plate 38 comprises a portion of the carbon sealing system and is disposed adjacent inner race 48A. Bearing spacer 40 abuts both inner races 48A and 48B to provide necessary spacing between first and second tapered roller bearings 14A and 14B. Gear 42 is contacted by inner race 48B of second tapered roller bearing 14B and connects to a shoulder portion of fan shaft 16. In the embodiment shown in FIG. 2, secondary sleeve 44 is disposed between outer race 52A of first tapered roller bearing 14A and bearing support 18. Tapered roller bearings 14A and 14B can also be supported by squeeze film damper system 46 (of which only seals are shown) disposed between one or more of the tapered roller bearings 14A and 14B and bearing support 18. Squeeze film damper systems such as the one disclosed herein are well known in the art and are used to shift critical speeds and/or to increase the dynamic stability of a rotor-bearing system.

In particular, first and second tapered roller bearings 14A and 14B have inner races 48A and 48B that are clamped or otherwise affixed to fan shaft 16. Inner races 48A and 48B have radially outward surfaces (raceways) that interface with roller elements 50A and 50B, respectively. Outer races 52A and 52B interface with roller elements 50A and 50B, respectively, and are mounted to bearing support 18. In the embodiment shown in FIG. 2, outer race 52A of first tapered roller bearing 14A is constrained radially and tangentially but can move axially relative to secondary sleeve 44, bearing support 18, and portions of squeeze film damper system 46. This allows roller element 50A to remain in contact with inner raceway of outer race 52A. Outer race 52B of second tapered roller bearing 14B is fastened to bearing support 18. First and second tapered roller bearings 14A and 14B are retained by bearing support 18, which reacts loads back through to the engine case 36.

In one embodiment, a forward end of bellows spring 20 is snapped into an interference fit with outer race 52A, and an aft end of bellows spring 20 is snapped into an interference fit with shoulder 54 of bearing support 18. Thus, bellows spring 20 is positioned generally between first tapered roller bearing 14A and second tapered roller bearing 14B. At least one shim 56 can be positioned between the aft end of bellows spring 20 and shoulder 54. Shim 56 allows the spring preload to be accurately set to a desired level without requiring restrictive manufacturing tolerances of bellows spring 20, bearing support 18, or other components.

Nut 23 (FIG. 1) applies a clamping force which reacts through inner race 48A of first tapered roller bearing 14A, through bearing spacer 48, through inner race 48B of second tapered roller bearing 14B, and against gear 42 on fan shaft 16. Bellows spring 20 applies preload to both first tapered roller bearing 14A and second tapered roller bearing 14B. In particular, bellows spring 20 applies preload to outer race 52A and applies preload to bearing support 18 which transfers preload to outer race 52B of second tapered roller bearing 14B.

Figure 3:
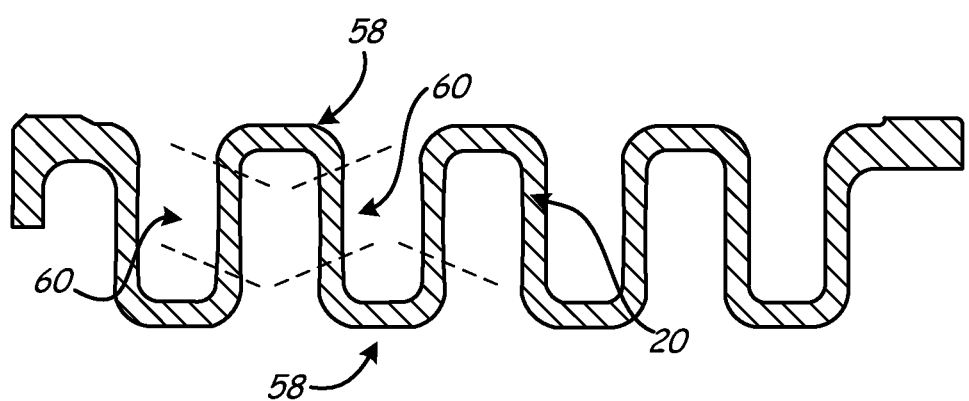
FIG. 3 is an enlarged cross section of the bellows spring of FIG. 2.

FIG. 3 shows an enlarged cross section of one embodiment of bellows spring 20. In the embodiment shown in FIG. 3, bellows spring 20 is a resilient member that is shaped as a corrugated single piece annular ring. Bellows spring 20 is comprised of a hardened stainless steel. Bellows spring 20 is lathe turned to produce the corrugated shape shown. As illustrated in FIG. 3, bellows spring 20 can have a cross-sectional thickness that is variable as the bellows spring 20 extends axially along an engine centerline $C_L$ (FIG. 1).

The number of turns (convolutes) of bellows spring 20 should be maximized (as limited by the size of the bearing compartment 12 and manufacturing practicality) to allow the bellows spring 20 to better accommodate different tolerances of components within the bearing compartment 12. Analytical tools such as commercially available finite element analysis software can be used to simulate stresses on bellows spring 20 in order to optimize its geometry (number of turns, cross-sectional thicknesses, etc.) and performance. In one embodiment, the turns of bellow spring 20 have a modified omega shape, that is each convolute section 58 of bellows spring 20 extends forward and aft of adjacent interconnection sections 60 (i.e., bellows spring 20 has sections 58 which bend forward or aft relative adjacent sections 60). Other embodiments can have parallel convolutes to simplify the manufacturing of bellows spring 20.

The use of bellows spring 20 to apply preload to first tapered roller bearing 14A and second tapered roller bearing 14B allows a single element to be used in the confined space of bearing compartment 12, thereby saving space and reducing manufacturing costs. Bellows spring 20 is adapted to apply preload to first and second tapered roller bearings 14A and 14B in the axial direction along the engine centerline $C_L$ (FIG. 1), and act as a centering spring (i.e. have a radial stiffness with respect to the engine centerline $C_L$) for the squeeze film damper system 46 (FIG. 2). Bellows spring 20 is accommodating of flexing in the radial direction by first tapered roller bearing 14A and the second tapered roller bearing 14B such that bellows spring 20 does not excessively wear on the surfaces of the bearings 14A and 14B.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
   a first tapered roller bearing, wherein the first tapered roller bearing has an outer race;
   a second tapered roller bearing;
   a bearing support disposed adjacent the second tapered roller bearing; and
   a bellows spring disposed adjacent the first tapered roller bearing and the second tapered roller bearing, wherein the bellows spring is snapped into an interference fit with the outer race of the first tapered roller bearing, and wherein the bellows spring is snapped into an interference fit with the bearing support.

2. The assembly of claim 1, further comprising a shim disposed between the bellows spring and the bearing support.

3. The assembly of claim 1, wherein the bellows spring comprises a corrugated single piece annular ring.

4. The assembly of claim 3, wherein the bellows spring comprises a steel.

5. The assembly of claim 3, wherein the bellows spring has a cross-sectional thickness that is variable as the bellows spring extends axially along an engine centerline.

6. The assembly of claim 1, further comprising a spacer that is disposed between an inner race of the first tapered roller bearing and an inner race of the second tapered roller bearing.

7. A gas turbine engine, comprising:
a bearing support mounted within the gas turbine engine;
a shaft rotatably mounted within the gas turbine engine adjacent the bearing support;
a first tapered roller bearing and a second tapered roller bearing disposed between the shaft and the bearing support, wherein the first tapered roller bearing has an outer race and the bearing support is disposed adjacent the second tapered roller bearing; and
a bellows spring positioned adjacent the first tapered roller bearing and the second tapered roller bearing within a bearing compartment, wherein the bellows spring is snapped into an interference fit with the outer race of the first tapered roller bearing, and wherein the bellows spring is snapped into an interference fit with the bearing support.

8. The gas turbine engine of claim 7, wherein a bearing support is disposed adjacent the first tapered roller bearing and is contacted by the bellows spring.

9. The gas turbine engine of claim 7, wherein the bellows spring comprises a corrugated single piece annular ring.

10. The gas turbine engine of claim 9, wherein the bellows spring comprises a steel.

11. The gas turbine engine of claim 9, wherein the bellows spring has a cross-sectional thickness that is variable as the bellows spring extends axially along an engine centerline.

12. The gas turbine engine of claim 7, further comprising a secondary sleeve disposed between the first tapered roller bearing and the bearing support.

13. The gas turbine engine of claim 7, further comprising a squeeze film damper positioned between the first roller bearing and the bearing support to reduce shaft vibration and instability.

14. The gas turbine engine of claim 7, further comprising a spacer that is disposed between an inner race of the first tapered roller bearing and an inner race of the second tapered roller bearing.

15. A method of applying a preload to a first tapered roller bearing and a second tapered roller bearing, the method comprising:
disposing the first tapered roller bearing within a bearing compartment;
positioning the second tapered roller bearing adjacent the first tapered roller bearing within the bearing compartment; and
disposing a bellows spring within the bearing compartment between the first tapered roller bearing and the second tapered roller bearing to apply the preload to both the first tapered roller bearing and the second tapered roller bearing;
snapping the bellows spring into an interference fit with an outer race of the first tapered roller bearing; and
snapping the bellows spring into an interference fit with a bearing support that is disposed adjacent the second tapered roller bearing, wherein the bellows spring applies preload in an axial direction with respect to an engine centerline and is accommodating of flexing in a radial direction with respect to the engine centerline by the first tapered roller bearing and the second tapered roller bearing.

16. The method of claim 15, further comprising a bearing support disposed adjacent the first tapered roller bearing, the bellows spring applies preload to the bearing support which transfers the preload to the second tapered roller bearing.

* * * * *